United States Patent
Cho et al.

(10) Patent No.: US 8,780,844 B2
(45) Date of Patent: Jul. 15, 2014

(54) METHOD AND APPARATUS FOR ALLOCATING RESOURCES FOR ENHANCED MULTICAST BROADCAST SERVICE DATA IN WIRELESS COMMUNICATION SYSTEM

(75) Inventors: Han Gyu Cho, Anyang-si (KR); Jin Soo Choi, Anyang-si (KR); Dong Cheol Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 36 days.

(21) Appl. No.: 13/520,783

(22) PCT Filed: Jan. 11, 2011

(86) PCT No.: PCT/KR2011/000148
§ 371 (c)(1),
(2), (4) Date: Jul. 5, 2012

(87) PCT Pub. No.: WO2011/087242
PCT Pub. Date: Jul. 21, 2011

(65) Prior Publication Data
US 2012/0275370 A1 Nov. 1, 2012

Related U.S. Application Data

(60) Provisional application No. 61/335,772, filed on Jan. 12, 2010.

(30) Foreign Application Priority Data

Jan. 10, 2011 (KR) .......................... 10-2011-0002087

(51) Int. Cl.
*H04W 4/00* (2009.01)
*H04W 72/04* (2009.01)
*H04W 72/00* (2009.01)

(52) U.S. Cl.
CPC ............ *H04W 72/044* (2013.01); *H04W 72/04* (2013.01); *H04W 72/0493* (2013.01); *H04W 72/005* (2013.01)
USPC ............ 370/329; 370/310; 370/312; 370/330

(58) Field of Classification Search
CPC ............ H04W 72/005; H04W 72/004; H04W 72/044; H04W 72/0493
USPC ................... 370/312, 310, 329, 330
See application file for complete search history.

(56) References Cited

U.S. PATENT DOCUMENTS

| 2009/0257343 | A1 | 10/2009 | Qi et al. | |
| 2010/0202340 | A1* | 8/2010 | Josiam et al. | 370/312 |
| 2011/0051676 | A1* | 3/2011 | Josiam et al. | 370/329 |

FOREIGN PATENT DOCUMENTS

| KR | 10-2007-0023485 | 2/2007 |
| KR | 10-2009-0108536 | 10/2009 |
| KR | 10-2010-0003692 | 1/2010 |

OTHER PUBLICATIONS

Shkumbin Hamiti, IEEE 802.16m System Description Document [Draft], May 31, 2009, IEEE, pp. 1-183.*

*Primary Examiner* — Huy D Vu
*Assistant Examiner* — Kuo T Chiang
(74) *Attorney, Agent, or Firm* — Lee, Hong, Degerman, Kang & Waimey

(57) ABSTRACT

Provided are a method and apparatus for allocating resources for enhanced multicast broadcast service (E-MBS) data in a wireless communication system. A base station divides a frequency region into at least one frequency partition and allocates subbands of $K_{SB,E-MBS}$ number as the resources for the E-MBS data in the frequency partition. One sub-band includes sub-band logical resource units (SLRUs) of N1 number and the SLRUs of N1 number have continuous indexes among a plurality of physical resource units (PRUs) included in the frequency partition and are the PRUs to be allocated to contiguous resource units (CRUs).

10 Claims, 12 Drawing Sheets

METHOD AND APPARATUS FOR ALLOCATING RESOURCES FOR ENHANCED MULTICAST BROADCAST SERVICE DATA IN WIRELESS COMMUNICATION SYSTEM

CROSS-REFERENCE TO RELATED APPLICATIONS

This application is the National Stage filing under 35 U.S.C. 371 of International Application No. PCT/KR2011/000148, filed on Jan. 11, 2011, which claims the benefit of earlier filing date and right of priority to Korean Application No. 10-2011-0002087, filed on Jan. 10, 2011, and also claims the benefit of U.S. Provisional Application Ser. No. 61/335,772, filed on Jan. 12, 2010, the contents of which are all incorporated by reference herein in their entirety.

BACKGROUND OF THE INVENTION

1. Field of the Invention

The present invention relates to wireless communications, and more particularly, to a method and apparatus for allocating a resource for enhanced multicast broadcast service (E-MBS) data in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

An enhanced multicast broadcast service (E-MBS) represents a point-to-multipoint communication system which simultaneously transmits data packets from one source station to a plurality of destination stations. Broadcast represents capability for delivering contents to all users. Multicast represents contents delivered to a specific user group including subscribers in association with reception of a corresponding service or the like.

A downlink resource can be allocated for transmission of the E-MBS data. The downlink resource allocated for transmission of the E-MBS data can be called an E-MBS zone. A method for allocating the E-MBS zone has not been discussed so far in an IEEE 802.16m system. Accordingly, there is a need for a method of effectively allocating the E-MBS zone.

SUMMARY OF THE INVENTION

The present invention provides a method and apparatus for allocating a resource for enhanced multicast broadcast service (E-MBS) data in a wireless communication system.

In an aspect, a method of allocating resources for enhanced multicast broadcast service (E-MBS) data in a wireless communication system is provided. The method includes dividing a frequency domain into at least one frequency partition, and allocating $K_{SB,E\text{-}MBS}$ subbands in the at least one frequency partition to a resource for the E-MBS data, wherein one subband includes N1 subband logical resource units (SLRUs), and wherein the N1 SLRUs have contiguous indices among a plurality of physical resource units (PRUs) included in the frequency partition and are PRUs allocated to contiguous resource units (CRUs).

If the at least one frequency partition includes a reuse 1 partition, the $K_{SB,E\text{-}MBS}$ subbands may be allocated from the reuse 1 partition. The $K_{SB,E\text{-}MBS}$ subbands may be allocated from an SLRU having a smallest index in the reuse 1 partition. Indices of a plurality of SLRUs constituting the $K_{SB,E\text{-}MBS}$ subbands may be determined by the equation $SLRU_{E\text{-}MBS}[k] = SLRU_{FP0}[k]$, for $0 \leq k < N1*K_{SB,E\text{-}MBS}$, where $SLRU_{FP0}[k]$ is an index of an SLRU included in the reuse 1 partition.

If the at least one frequency partition does not include the reuse 1 partition, the $K_{SB,E\text{-}MBS}$ subbands may be allocated from a plurality of reuse 3 partitions. The $K_{SB,E\text{-}MBS}$ subbands may be equitably allocated from the plurality of reuse 3 partitions. The $K_{SB,E\text{-}MBS}$ subbands may be sequentially allocated from an SLRU having a smallest index in a frequency partition having a smallest index among the reuse 3 partitions. The number of PRUs constituting each of the plurality of reuse 3 partitions is determined by the equation $$L_{EMBS,FPm} = \begin{cases} N_1 \cdot \left\lceil \dfrac{K_{SB,E-MBS}}{FPCT} \right\rceil & m = 1, \ldots, K_{SB,E-MBS} - FPCT \cdot \left\lfloor \dfrac{K_{SB,E-MBS}}{FPCT} \right\rfloor \\ N_1 \cdot \left\lfloor \dfrac{K_{SB,E-MBS}}{FPCT} \right\rfloor & m = K_{SB,E-MBS} - FPCT \cdot \\ & \left\lfloor \dfrac{K_{SB,E-MBS}}{FPCT} \right\rfloor + 1, \ldots, FPCT, \end{cases}$$

where FPCT is the number of the plurality of reuse 3 partitions.

Indices of the $K_{SB,E-MBS}$ subbands may be determined by the equation $$SB_{E-MBS}[m] = \left\{ \text{All } SLRU_{E-MBS}[k] \text{ with indices } k \text{ such that } \left\lfloor \dfrac{k}{N_1} \right\rfloor = m \right\},$$

with $0 \leq m < K_{SB,E-MBS}$.

N1 may be 4.

$K_{SB,E-MBS}$ may be indicated by a Zone Allocation BitMAP field in an AAI-E-MBS_CFG message.

The method may further include transmitting E-MBS data by using a resource for the allocated E-MBS data. The E-MBS data may be multiplexed with unicast data for a specific user equipment in a frequency division multiplexing (FDM) manner.

In another aspect, a base station is provided. The base station includes a radio frequency (RF) unit transmitting or receiving a radio signal, and a processor operatively coupled to the RF unit, wherein the processor is configured for dividing a frequency domain into at least one frequency partition, and allocating $K_{SB,E-MBS}$ subbands in the at least one frequency partition to a resource for enhanced multicast broadcast service (E-MBS) data, wherein one subband includes N1 subband logical resource units (SLRUs), and wherein the N1 SLRUs have contiguous indices among a plurality of physical resource units (PRUs) included in the frequency partition and are PRUs allocated to contiguous resource units (CRUs).

In another aspect, a method of receiving enhanced multicast broadcast service (E-MBS) data in a wireless communication system is provided. The method includes receiving the E-MBS data by using an allocated E-MBS resource, wherein the E-MBS resource consists of $K_{SB,E-MBS}$ subbands in at least one frequency partition, wherein one subband includes N1 subband logical resource units (SLRUs), and wherein the N1 SLRUs have contiguous indices among a plurality of physical resource units (PRUs) included in the frequency partition and are PRUs allocated to contiguous resource units (CRUs).

Enhanced multicast broadcast service (E-MBS) data can be effectively transmitted by allocating an E-MBS zone when there are a plurality of frequency partitions (FPs) and a fractional frequency reuse (FFR) scheme is used.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
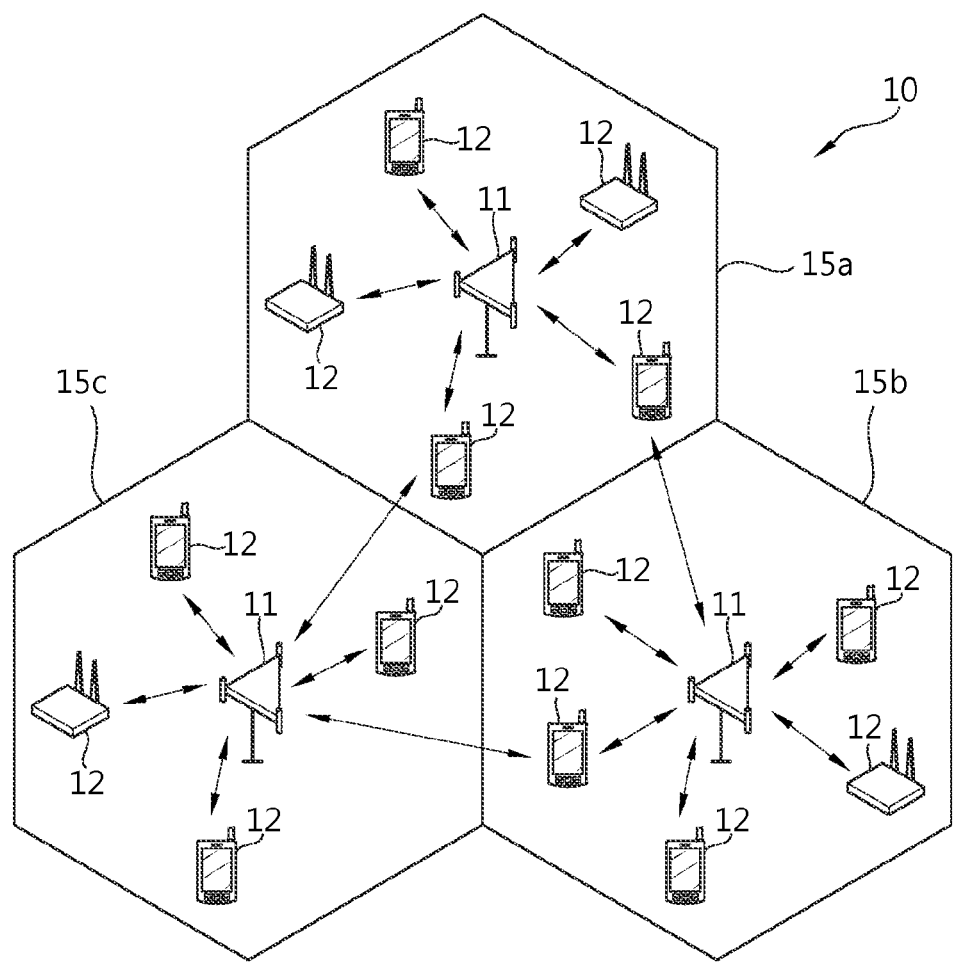
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
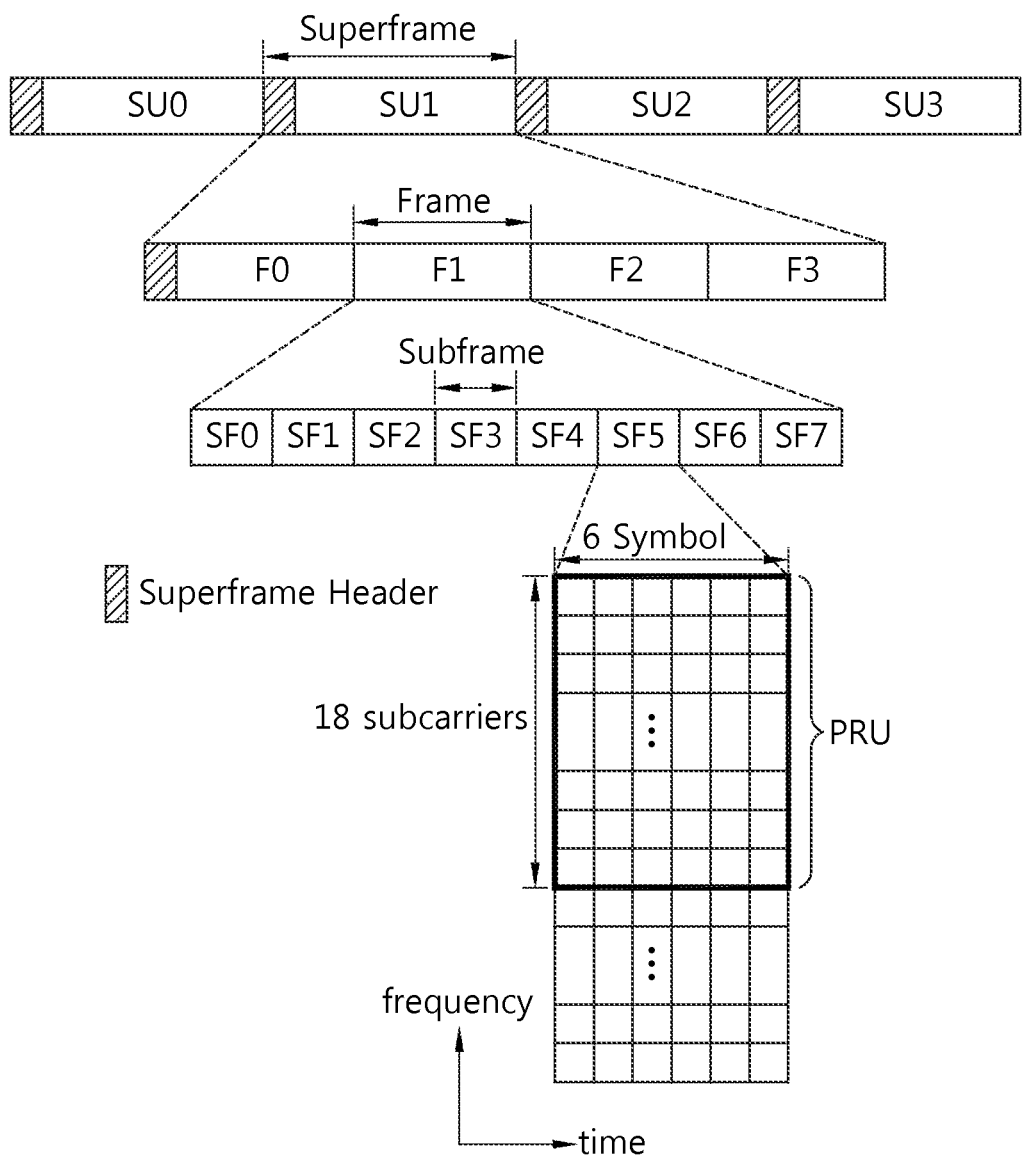
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. A switching point refers to a point where a transmission direction is changed from an uplink region to a downlink region or from a downlink region to an uplink region. In the TDD, the number of the switching points in each frame may be two. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A superframe header (SFH) may carry an essential system parameter and system configuration information. The SFH may be located in a first subframe of a superframe. The SFH may occupy last 5 OFDMA symbols of the first subframe. The SFH can be classified into a primary-SFH (P-SFH) and a secondary-SFH (S-SFH). The P-SFH and the S-SFH may be transmitted in every superframe. The S-SFH may be transmitted in two consecutive superframes. Information transmitted on the S-SFH may be classified into three sub-packets, i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP2 includes information on initial network entry and network discovery. The S-SFH SP3 includes other important system information.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| | | | | | | | |
|---|---|---|---|---|---|---|---|
| Channel bandwidth, BW(MHz) | | | 5 | 7 | 8.75 | 10 | 20 |
| Sampling factor, n | | | 28/25 | 8/7 | 8/7 | 28/25 | 28/25 |
| Sampling frequency, Fs(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, Δf(kHz) | | | 10.94 | 7.81 | 9.77 | 10.94 | 10.94 |
| Useful symbol time Tb(μs) | | | 91.4 | 128 | 102.4 | 91.4 | 91.4 |
| G = 1/8 | Symbol time, Ts(μs) | | 102.857 | 144 | 115.2 | 102.857 | 102.857 |
| | FDD | Number of OFDMA symbols per 5 ms frame | 48 | 34 | 43 | 48 | 48 |
| | | Idle time(μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG(μs) | 165.714 | 248 | 161.6 | 165.714 | 165.714 |

TABLE 1-continued

| | | | | | | | |
|---|---|---|---|---|---|---|---|
| G = 1/16 | | Symbol time, Ts(μs) | 97.143 | 136 | 108.8 | 97.143 | 97.143 |
| | FDD | Number of OFDMA symbols per 5 ms frame | 51 | 36 | 45 | 51 | 51 |
| | | Idle time(μs) | 45.71 | 104 | 104 | 45.71 | 45.71 |
| | TDD | Number of OFDMA symbols per 5 ms frame | 50 | 35 | 44 | 50 | 50 |
| | | TTG + RTG(μs) | 142.853 | 240 | 212.8 | 142.853 | 142.853 |
| G = 1/4 | | Symbol time, Ts(μs) | 114.286 | 160 | 128 | 114.286 | 114.286 |
| | FDD | Number of OFDMA symbols per 5 ms frame | 43 | 31 | 39 | 43 | 43 |
| | | Idle time(μs) | 85.694 | 40 | 8 | 85.694 | 85.694 |
| | TDD | Number of OFDMA symbols per 5 ms frame | 42 | 30 | 38 | 42 | 42 |
| | | TTG + RTG(μs) | 199.98 | 200 | 136 | 199.98 | 199.98 |
| Number of Guard subcarriers | | Left | 40 | 80 | 80 | 80 | 160 |
| | | Right | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$. A sampling factor is defined as $F_s$=floor(n·BW/8000)× 8000. A subcarrier spacing is defined as $\Delta f = F_s/NFFT$. A useful symbol time is defined as $T_b = 1/\Delta f$. A CP time is defined as $T_g = G \cdot T_b$. An OFDMA symbol time is defined as $T_s = T_b + T_g$. A sampling time is defined as $T_b/N_{FFT}$.

Figure 3:
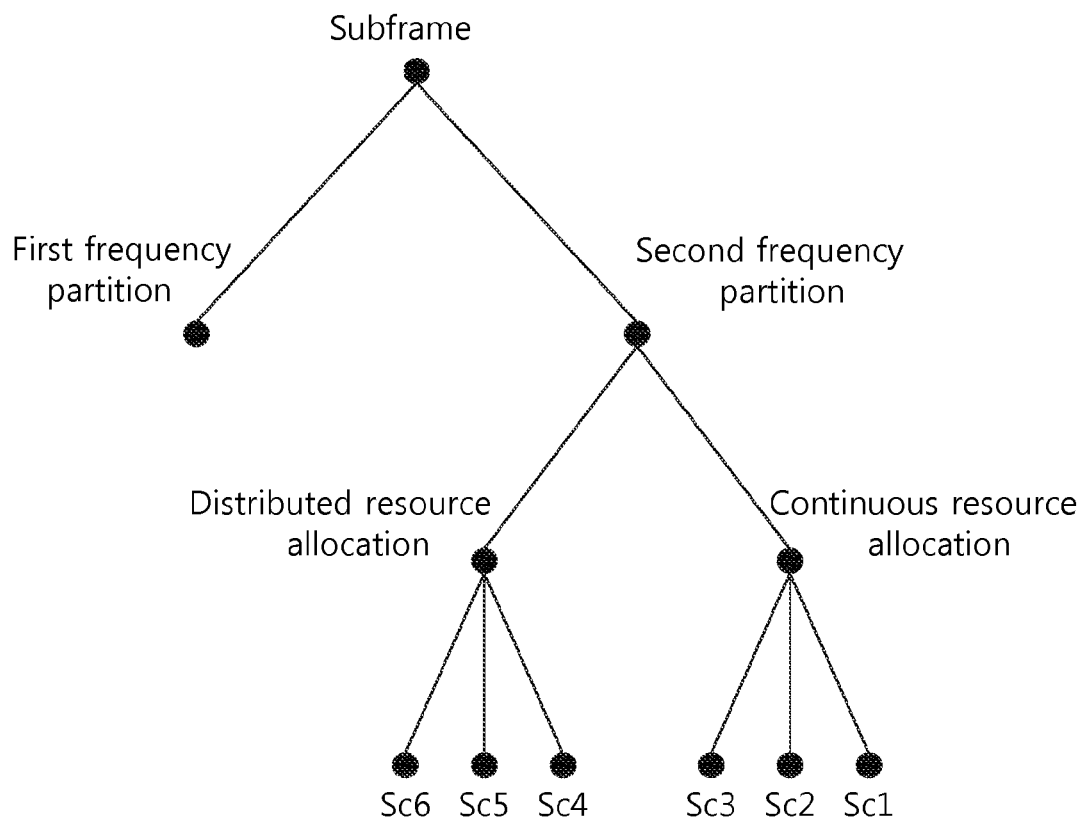
FIG. 3 shows an example of a downlink resource structure.

FIG. 3 shows an example of a downlink resource structure.

Each downlink subframe can be divided into 4 or less frequency partitions. Although a subframe is divided into two frequency partitions (i.e., FP1 and FP2) in FIG. 3, this is for exemplary purposes only, and thus the number of frequency partitions in the subframe is not limited thereto. Each frequency partition consists of at least one physical resource unit (PRU) across all available orthogonal frequency division multiple access (OFDMA) symbols in the subframe. In addition, each frequency partition may include contiguous/localized and/or distributed RRUs. Each frequency partition may be used for other purposes such as fractional frequency reuse (FFR). The FP2 of FIG. 3 includes both contiguous resource allocation and distributed resource allocation. 'Sc' denotes a subcarrier.

The PRU is a basic physical unit for resource allocation, and includes Psc contiguous subcarriers and Nsym contiguous OFDMA symbols. Psc may be 18. Nsym may be equal to the number of OFDMA symbols included in one subframe. Therefore, Nsym may be determined according to a subframe type. For example, when one subframe consists of 6 OFDMA symbols, the PRU can be defined with 18 subcarriers and 6 OFDMA symbols. A logical resource unit (LRU) is a basic logical unit for distributed and contiguous resource allocations.

A distributed logical resource unit (DLRU) can be used to obtain a frequency diversity gain. The DLRU includes a group of subcarriers distributed in one frequency partition. A minimum unit of constituting the DLRU may be a tone pair which is a pair of a plurality of subcarriers. A downlink DLRU can be obtained by performing subcarrier permutation on a data subcarrier of a distributed resource unit (DRU). The DRU has the same size as the PRU. That is, Psc subcarriers and Nsym OFDMA symbols can be included.

A contiguous logical resource unit (CLRU) can be used to obtain a frequency selective scheduling gain. The CLRU includes a group of contiguous subcarriers in a resource allocated in a localized manner. The CLRU consists of a data subcarrier in a contiguous resource unit (CRU). The CRU has the same size as the PRU. The CLRU can be obtained by directly mapping the CRU. The CLRU can be divided into a subband LRU (SLRU) and a miniband LRU (NLRU) according to a type of the CRU which is a basis of the CLRU.

Meanwhile, a fractional frequency reuse (FFR) scheme can be used in a cellular system having multiple cells. The FFR scheme divides a full frequency band into a plurality of frequency partitions (FPs), and allocates the FP to each cell. According to the FFR scheme, different FPs can be allocated between neighbor cells, and the same FP can be allocated between cells separated far from each other. Therefore, inter-cell interference (ICI) can be reduced, and performance of a UE located in a cell edge can be increased.

Figure 4:
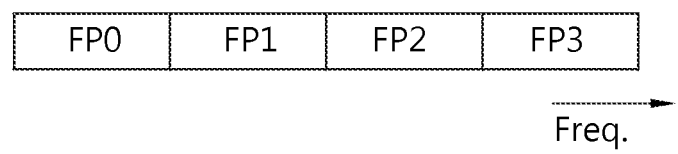
FIG. 4 shows an example of a method of dividing a full frequency band into a plurality of FPs.

FIG. 4 shows an example of a method of dividing a full frequency band into a plurality of FPs.

Referring to FIG. 4, the full frequency band is divided into a first FP (i.e., FP0), a second FP (i.e., FP1), a third FP (i.e., FP2), and a fourth FP (i.e., FP3). Each FP can be physically or logically divided from the full frequency band.

Figure 5:
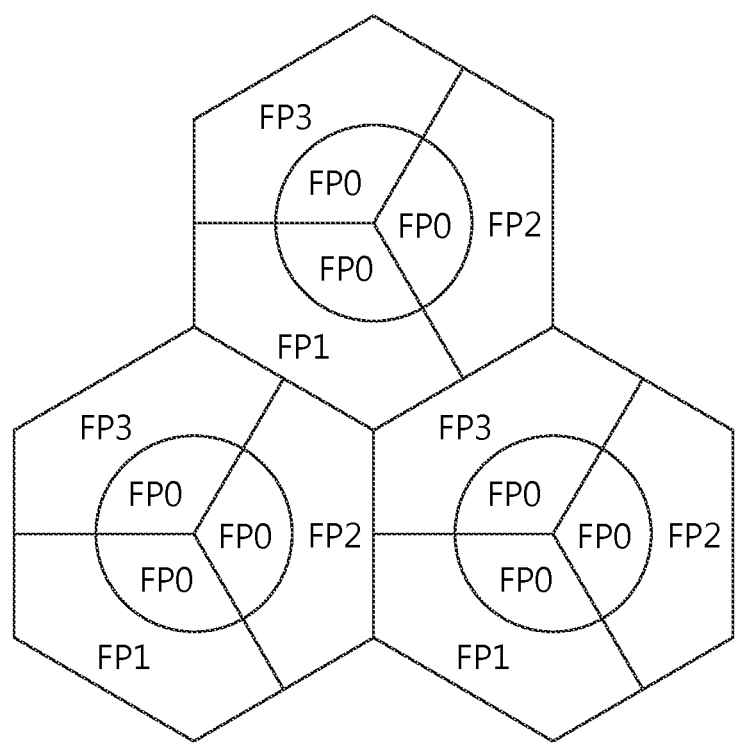
FIG. 5 shows an example of a cellular system using an FFR scheme.

FIG. 5 shows an example of a cellular system using an FFR scheme.

Referring to FIG. 5, each cell is divided into an inner cell and a cell edge. Further, each cell is divided into three sectors. It is assumed that a full frequency band is divided into four FPs (i.e., FP0, FP1, FP2, and FP3).

The first FP (i.e., FP0) is allocated in the inner cell. Any one of the second FP (i.e., FP1) to the fourth FP (i.e., FP3) is allocated in each sector of the cell edge. In this case, different FPs are allocated between neighbor cells. Hereinafter, an allocated FP is referred to as an active FP, and an unallocated FP is referred to as an inactive FP. For example, when the second FP (i.e., FP1) is allocated, the second FP is an active FP, and the third FP (i.e., FP2) and the fourth FP (i.e., FP3) are inactive FPs.

A frequency reuse factor (FRF) can be defined as the number of cells (or sectors) into which the full frequency band can be divided. In this case, the FRF may be 1 in the inner cell, and may be 3 in each sector of the cell edge.

When a plurality of cells exists, a downlink resource may be mapped by performing various processes such as subband partitioning, miniband permutation, frequency partitioning, etc. Such a process can be called a subchannelization process.

First, the subband partitioning process will be described.

Figure 6:
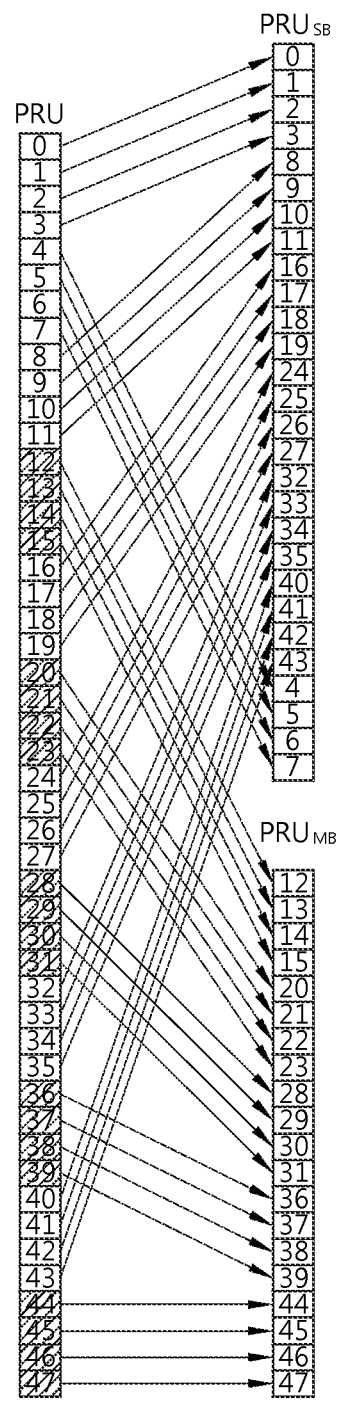
FIG. 6 shows an example of a subband partitioning process.

FIG. 6 shows an example of a subband partitioning process. A bandwidth of 10 MHz is used in the subband partitioning process of FIG. 6.

A plurality of PRUs is divided into a subband (SB) and a miniband (MB). The SB includes N1 contiguous PRUs, and the MB includes N2 contiguous PRUs. In this case, N1 may be 4 and N2 may be 1. The SB is suitable for frequency selective resource allocation since it provides contiguous allocation of PRUs in a frequency domain. The MB is suitable for frequency diverse resource allocation and may be permutated in the frequency domain.

The number of SBs can be denoted by $K_{SB}$. The number of PRUs allocated to the SBs can be denoted by $L_{SB}$, where $L_{SB}=N1*K_{SB}$. The $K_{SB}$ may vary depending on a bandwidth. A 3- to 5-bit downlink subband allocation count (DSAC) can determine $K_{SB}$ based on a fast Fourier transform (FFT) size. The DSAC can be transmitted through an SFH. PRUs remaining after being allocated to the SBs are allocated to MBs. The number of MBs can be denoted by $K_{MB}$. The number of PRUs allocated to the MBs can be denoted by $L_{MB}$, where $L_{MB}=N2*K_{MB}$. The total number of PRUs is $N_{PRU}=L_{SB}+L_{MB}$.

A plurality of PRUs is divided into a subband (SB) and a miniband (MB), and is reordered in an SB PRU ($PRU_{SB}$) and an MB PRU ($PRU_{MB}$). PRUs in the $PRU_{SB}$ are respectively indexed from 0 to ($L_{SB}-1$). PRUs in the $PRU_{MB}$ are respectively indexed from 0 to ($L_{MB}-1$).

Figure 7:
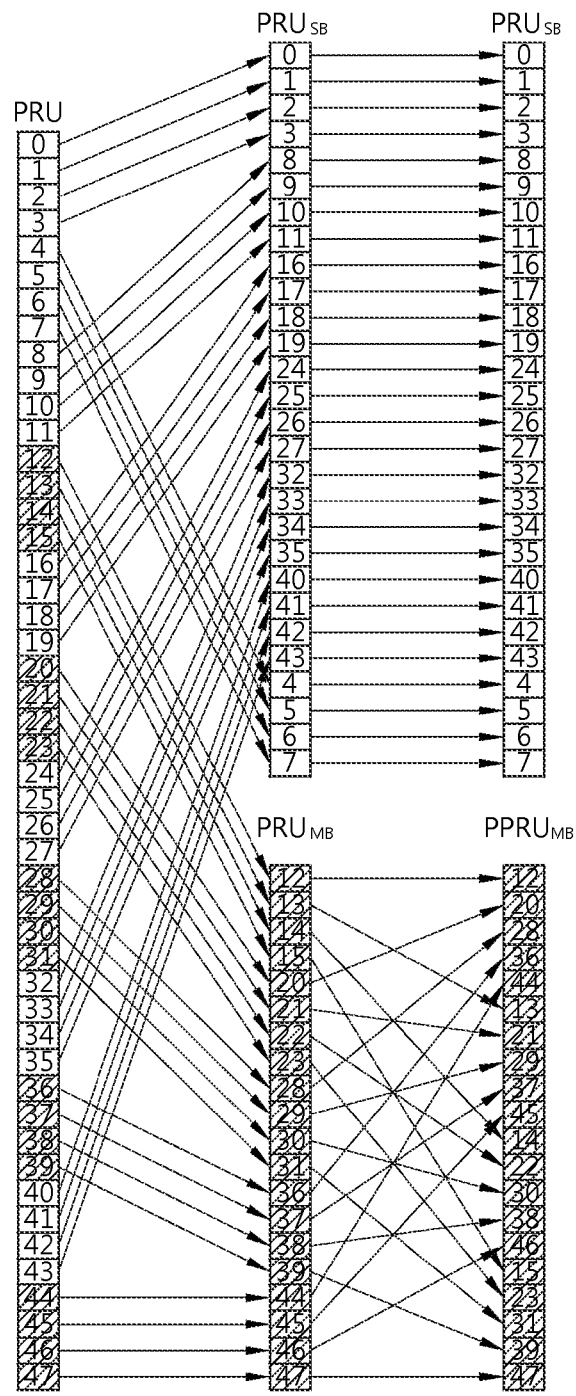
FIG. 7 shows an example of a miniband permutation process.

FIG. 7 shows an example of a miniband permutation process. The process of FIG. 7 can be performed subsequent to the subband partitioning process of FIG. 6 when using a bandwidth of 10 MHz. In the miniband permutation process, a $PRU_{MB}$ is mapped to a permutation PRU ($PPRU_{MB}$). This is to ensure frequency diversity in each frequency partition.

Figure 8:
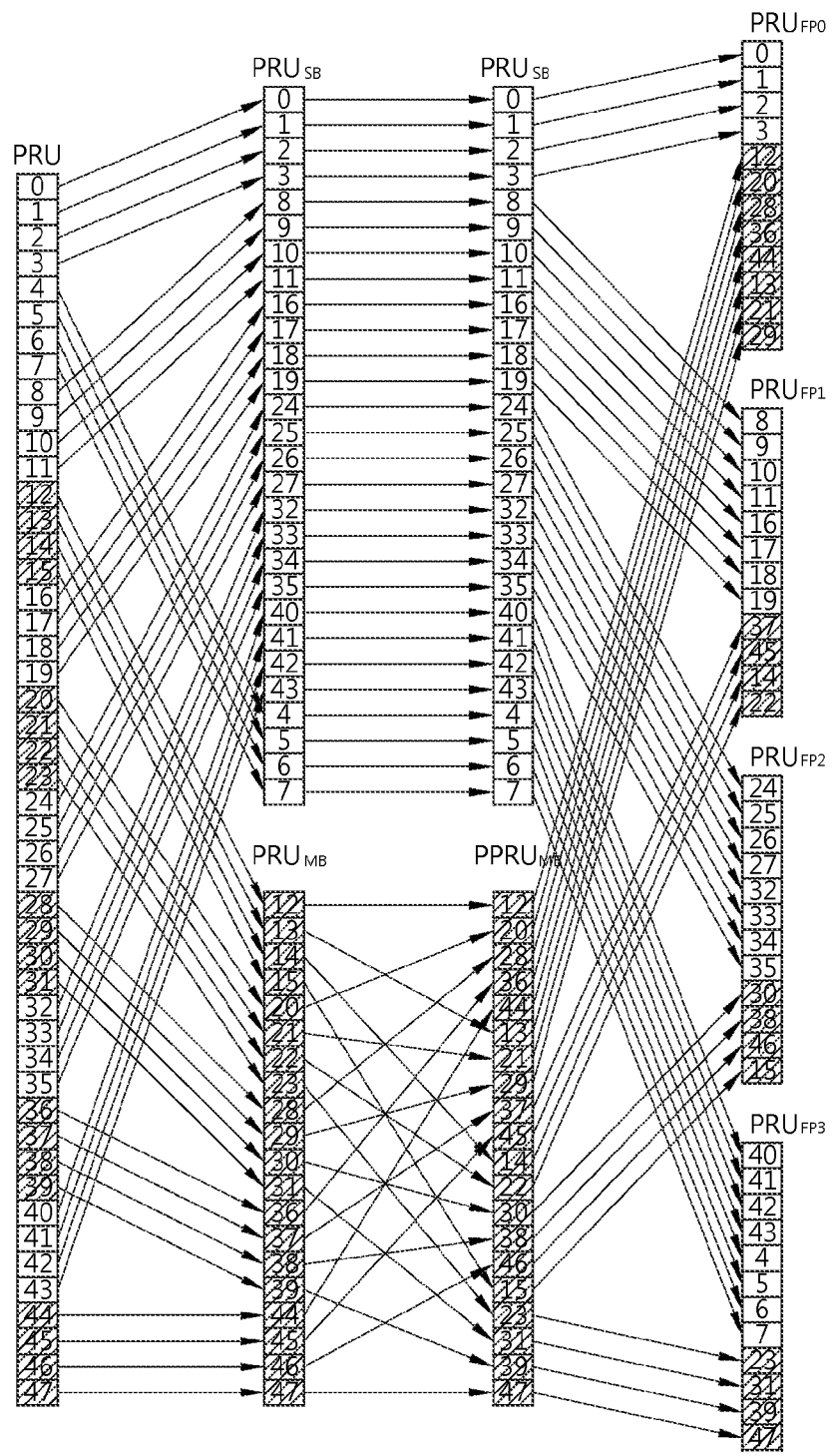
FIG. 8 shows an example of a frequency partitioning process.

FIG. 8 shows an example of a frequency partitioning process. The process of FIG. 8 can be performed subsequent to the subband partitioning process of FIG. 6 and the miniband permutation process of FIG. 7 when using a bandwidth of 10 MHz. PRUs of a $PRU_{SB}$ and a $PPRU_{MB}$ are allocated to at least one frequency partition. The maximum number of frequency partitions may be 4. Frequency partition configuration information may be determined by downlink frequency partition configuration (DFPC). The DFPC may have a different configuration according to a bandwidth, and may be broadcast by using an S-SFH or the like. The DFPC may have a length of 3 bits or 4 bits. The DFPC may indicate a size of a frequency partition, the number of frequency partitions, etc. A frequency partition count (FPCT) denotes the number of frequency partitions. FPSi denotes the number of PRUs allocated to an FPi. Further, a downlink frequency partition subband count (DFPSC) defines the number of SBs allocated to the FPi (where i>0). The DFPSC may have a length of 1 to 3 bits.

The number of SBs in the FPi can be denoted by $K_{SB,FPi}$. The number of SB PRUs of each frequency partition can be denoted by $L_{SB,FPi}$, where $L_{SB,FPi}=N1*K_{SB,FPi}$. The number of MBs of the FPi can be denoted by $K_{MB,FPi}$. The number of MB PRUs of each frequency partition can be denoted by $L_{MB,FPi}$, where $L_{MB}=N2*K_{MB}$. The SB PRU and MB PRU in each frequency partition are mapped to a $PRU_{FPi}$.

The aforementioned SB partitioning, MB permutation, and frequency partitioning process corresponds to a resource mapping process for a plurality of cells. That is, the SB partitioning, MB permutation, and frequency partitioning process is commonly performed for a downlink resource allocated to a plurality of cells. After performing resource mapping for the plurality of cells, cell-specific resource mapping can be performed. The cell-specific resource mapping can include CRU/DRU allocation, subcarrier permutation, LRU mapping, etc. By using the cell-specific mapping, the $PRU_{FPi}$ is mapped to an LRU, and this can be performed only in one frequency partition.

The $PRU_{FPi}$ can be divided into a CRU and a DRU in one frequency partition. CRU/DRU allocation can be performed on a sector basis. In general, PRUs of the $PRU_{SB}$ are allocated to the CRU, and PRUs of the $PRU_{MB}$ are allocated to the DRU. However, in a first frequency partition, i.e., FP0, some of the PRUs allocated from the $PRU_{MB}$ can be allocated to the CRU. This is because resource allocation needs to be performed frequency selectively in general in the FP0 which uses a center frequency band.

In the frequency partition FPi, the number of allocated SB-based CRUs (hereinafter, SB CRUs) can be denoted by $L_{SB-CRU,FPi}$, and the number of allocated MB-based CRUs (hereinafter, MB CRUs) can be denoted by $L_{MB-CRU,FPi}$. The total number of SB CRUs and MB CRUs allocated in the FPi measured in a unit of N1 PRUs can be denoted by DCASi which is a downlink CRU allocation size.

Regarding the FP0, $DCAS_{SB,0}$ and $DCAS_{MB,0}$ can be broadcast through an SFH. $DCAS_{SB,0}$ denotes the number of SB CRUs allocated in the FP0 in a unit of subbands. $DCAS_{MB,0}$ denotes the number of MB CRUs allocated in the FP0 in a unit of minibands. $DCAS_{SB,0}$ may have a length of 3 to 5 bits. $DCAS_{SB,0}$ and $DCAS_{SB,0}$ may have a length of 3 to 5 bits. $DCAS_{MB,0}$ can vary depending on a bandwidth size. The number of SB CRUs of the FP0 can be denoted by $L_{SB-CRU,FP0}=N1*DCAS_{SB4,0}$. Regarding FPi(i>0, FPCT≠2), only the DCASi can be transmitted through the SFH.

The DCASi may have a length of 1 to 3 bits, and indicates the number of CRUs allocated to FPi(i>0, FPCT≠2) in a unit of subbands. The number of CRUs allocated to the FPi may be identical in all of the CRUs. That is, the number of CRUs in the FPi(i>0, FPCT≠2) is determined by the DCASi, and the number of DRUs is determined to a value obtained by subtracting the number of CRUs from the number of PRUs of each FP. Among the whole subbands, the remaining bands except for the CRUs allocated to the FPi(i>0, FPCT≠2) are allocated to the FP0.

The DRU is used to generate a 2-stream DLRU by using a subcarrier permutation process. Subcarrier permutation can be defined as distributed resource allocation for distributing a subcarrier of the DRU in one frequency partition to a whole resource region. A granularity of the subcarrier permutation may be a pair of subcarriers. After mapping all pilots, the remaining subcarriers can be mapped to the DLRU. To allocate the DLRU, the remaining subcarriers can be grouped in a continuous tone-pair, and each DLRU includes a tone-pair group.

In the LRU mapping process, a CRU is directly mapped to a CLRU, and the CLRU includes an SLRU based on an SB CRU and an NLRU based on an MB CRU. The DRU is mapped to the DLRU by using the subcarrier permutation process.

An IEEE 802.16m system can support an enhanced multicast broadcast service (E-MBS). The E-MBS can provide an effective method of simultaneously transmitting downlink data which is common to a plurality of users. The E-MBS can be supported only in a downlink, and can be coordinated and synchronized between BS groups to allow macro diversity.

In order to support the E-MBS and to transmit E-MBS data, a downlink resource for the E-MBS can be allocated. A specific carrier can be dedicated as the downlink resource for the E-MBS. Alternatively, when the specific subcarrier is not dedicated as the downlink resource for the E-MBS, the E-MBS data must be transmitted together with unicast data for a specific UE in one subcarrier. For this, there is a need to multiplex the E-MBS data and the unicast data. Therefore, in this case, there is a need for a method for effectively allocating the downlink resource for the E-MBS.

Now, the proposed method of allocating a resource for E-MBS data (hereinafter, referred to as an E-MBS resource) will be described according to an embodiment of the present invention.

Figure 9:
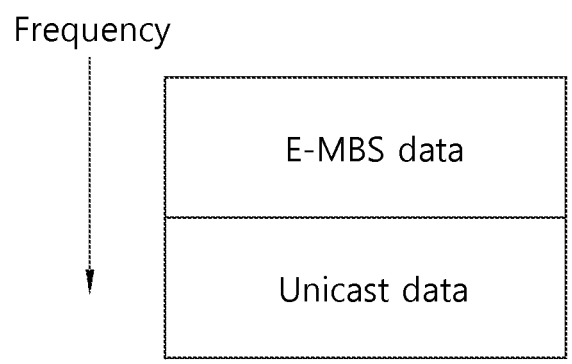
FIG. 9 shows a case where E-MBS data and unicast data are subjected to frequency division multiplexing (FDM).

FIG. 9 shows a case where E-MBS data and unicast data are subjected to frequency division multiplexing (FDM). When the E-MBS data is multiplexed with the unicast data, it can be multiplexed in a downlink subframe in an FDM manner. For convenience of explanation, it is assumed hereinafter that the E-MBS data and the unicast data are multiplexed in the FDM manner. However, the present invention is not limited thereto, and thus the E-MBS data and the unicast data can be multiplexed in various manners. More specifically, when the E-MBS data and the unicast data are multiplexed in the FDM manner, the E-MBS data can be transmitted by using a subband allocated to an FP0. In this case, a first subframe of each superframe does not include a subband since it is configured to transmit an SFH. Therefore, the E-MBS data is not scheduled in the first subframe of each superframe.

The E-MBS resource may be a plurality of subbands. The number of subbands used in transmission of the E-MBS data can be denoted by $K_{SB,E-MBS}$. The $K_{SB,E-MBS}$ subbands consist of a plurality of SLRUs. The $K_{SB,E-MBS}$ subbands can be indicated by Zone Allocation BitMAP in AAI-E-MBS_CFG. The Zone Allocation BitMAP may be included in an AAI-SCD message. The $K_{SB,E-MBS}$ subbands allocated in this manner constitute an E-MBS zone in a downlink subframe. In addition, E-MBS_SUBFRAME_INDICATOR indicates which subframe will transmit the E-MBS data among frames to which the E-MBS zone is allocated in a subcarrier. The Zone Allocation BitMAP and the E-MBS_SUBFRAME_INDICATOR are validly configured in a plurality of superframes in which an AAI-E-MBS_CFG indicator is valid.

When allocating the E-MBS resource in each frequency partition, the number of frequency partitions can be taken into account. In particular, a presence/absence of the FP0 which is a basis frequency partition can be taken into account. To support a multicast broadcast single frequency network (MB-SFN), in the presence of the FP0, the $K_{SB,E-MBS}$ subbands can be sequentially allocated starting from an SLRU having a smallest index among SLRUs of the FP0. In the absence of the FP0, the $K_{SB,E-MBS}$ subbands can be equitably allocated in the remaining frequency partitions. That is, the subbands can be allocated sequentially one by one starting from an SLRU having a smallest index in a frequency partition having a smallest index.

A mapping relation between an index of a PRU and an index of an $SLRU_{E-MBS}$ which is an SLRU included in a subband allocated to the E-MBS resource will be described below in detail by considering the presence/absence of the FP0.

1) In case of using the FP0, the $K_{SB,E-MBS}$ subbands for the E-MBS resource are allocated only from subbands in the FP0. Equation 1 shows a mapping relation of an $SLRU_{E-MBS}$ index and a PRU index in the FP0.

$SLRU_{E-MBS}[k]=SLRU_{FP0}[k]$, for $0 \le k < N_1 \cdot K_{SB-MBS}$  <Equation 1>

That is, according to Equation 1, the SLRU of the FP0 is directly mapped to the SLRU of the subband for the E-MBS resource, and mapping is performed sequentially starting from an SLRU having a smallest index among the SLRUs of the FP0.

2) The FP0 may not be used. For example, an FFR scheme is used in a reuse-3-only case. In this case, only an FP1 to an FP3 are present. If the FP0 is not used, the $K_{SB,E-MBS}$ subbands are equitably allocated to the remaining frequency partitions. Equation 2 indicates the number of PRUs for the E-MBS resource in FPi(i>0).

$$L_{EMBS,FPm} = \begin{cases} N_1 \cdot \left\lceil \frac{K_{SB,E-MBS}}{FPCT} \right\rceil & m = 1, \ldots, K_{SB,E-MBS} - FPCT \cdot \left\lfloor \frac{K_{SB,E-MBS}}{FPCT} \right\rfloor \\ N_1 \cdot \left\lfloor \frac{K_{SB,E-MBS}}{FPCT} \right\rfloor & m = K_{SB,E-MBS} - FPCT \cdot \left\lfloor \frac{K_{SB,E-MBS}}{FPCT} \right\rfloor + 1, \ldots, FPCT \end{cases}$$ <Equation 2>

Referring to Equation 2, the number of PRUs in a subband for the E-MBS resource in the FPi is equitably allocated in each frequency partition, and a PRU in the remaining subbands is allocated to a frequency partition having a low index.

Therefore, the number of PRUs for the E-MBS resource in each FPi(i>0) can be calculated by Equation 3 below.

$$X_i = \sum_{m=i}^{i} L_{EMBS,FPm}, 1 \le i \le FPCT$$ <Equation 3>

An $SLRU_{E-MBS}$ can be indexed by Equation 4.

$SLRU_{E-MBS}[k]=SLRU_{FPi}[k]$, <Equation 4> for $X_{i-1} \le k < X_i$ with $1 \le i < FPCT$, and $X_0 = 0$

That is, according to Equation 4, the $SLRU_{E-MBS}$ is indexed sequentially starting from an SLRU allocated from the FP1.

Equation 5 is another exemplary equation for indexing the $SLRU_{E-MBS}$.

<Equation 5>

$SLRU_{E-MBS}[k+X_{i-1}]=SLRU_{FPi}[k]$, for $0 \le k < L_{EMBS,FPi}$ with $1 \le i < FPCT$ In addition, a subband including the $SLRU_{E-MBS}$ can be indexed by Equation 6.

$$SB_{E-MBS}[m] = \left\{ \text{All } SLRU_{E-MBS}[k] \text{ with indices } k \text{ such that } \left\lfloor \frac{k}{N_1} \right\rfloor = m \right\},$$ <Equation 6> with $0 \le m < K_{SB,E-MBS}$

That is, a subband used in the E-MBS resource is also indexed in the order of the $SLRU_{E-MBS}$ indexed according to Equation 4 or Equation 5.

Figure 10:
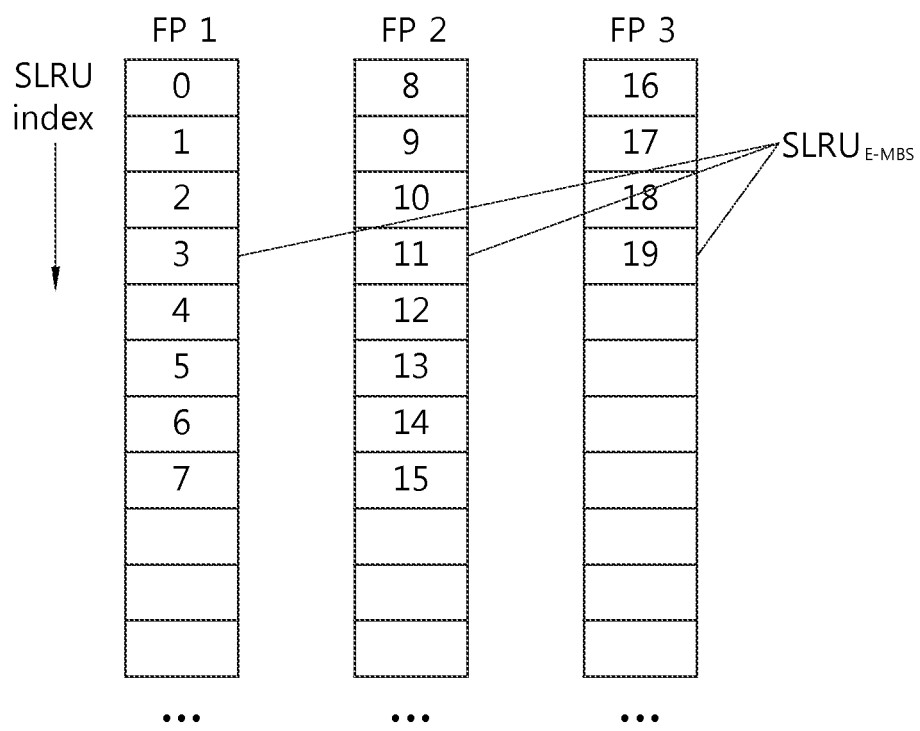
FIG. 10 is an example in which an E-MBS resource is allocated when an FP0 is not used.

FIG. 10 is an example in which an E-MBS resource is allocated when an FP0 is not used. Referring to FIG. 10, the number of subbands used for the E-MBS resource is 5. That is, $K_{SB,E-MBS}=5$. Since the FP0 is not used, the 5 subbands are equitably allocated to an FP1 to an FP3. Therefore, the number of subbands allocated for an E-MBS to the FP1, the FP2, and the FP3 are respectively 2, 2, and 1. In addition, the $SLRU_{E-MBS}$ is indexed starting from a frequency partition having a small index. That is, the $SLRU_{E-MBS}$ in the FP1 is indexed with 0 to 7, the $SLRU_{E-MBS}$ in the FP2 is indexed with 8 to 15, and the $SLRU_{E-MBS}$ in the FP3 is indexed with 16 to 19.

Figure 11:
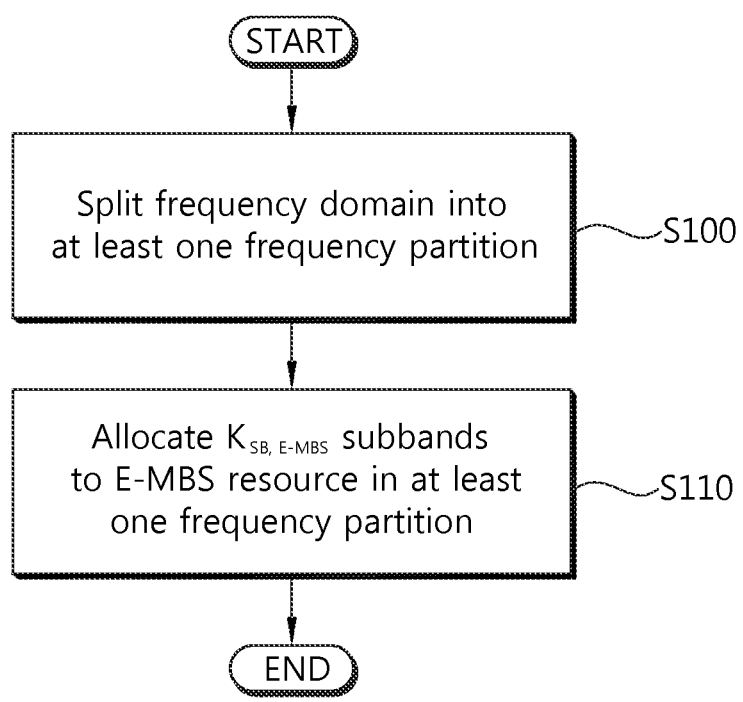
FIG. 11 is an embodiment of the proposed resource allocation method for E-MBS data.

FIG. 11 is an embodiment of the proposed resource allocation method for E-MBS data. In step S100, a BS splits a frequency domain into at least one frequency partition. In step S110, the BS allocates $K_{SB,E-MBS}$ subbands to an E-MBS resource in the at least one frequency partition. One subband may include N1 SLRUs. In this case, the E-MBS can be allocated by considering a presence/absence of an FP0 which is a basis frequency partition.

Figure 12:
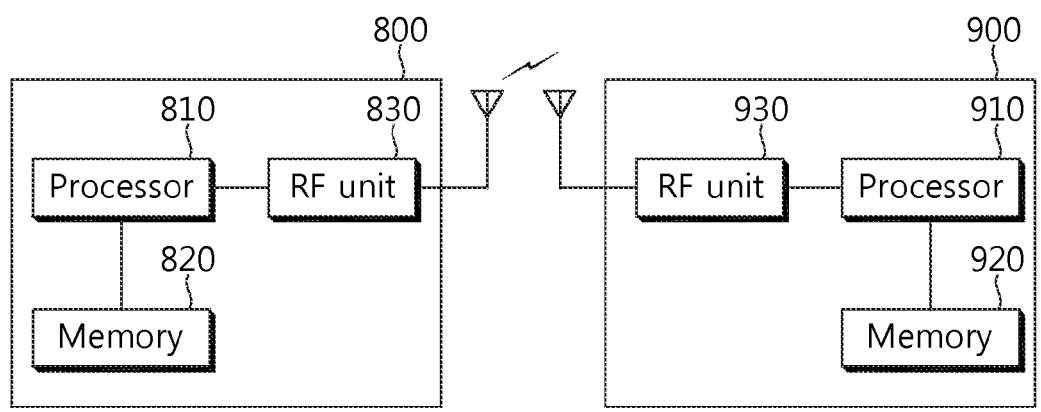
FIG. 12 is a block diagram of a BS and a UE according to an exemplary embodiment of the present invention.

FIG. 12 is a block diagram of a BS and a UE according to an exemplary embodiment of the present invention.

ABS 800 includes a processor 810, a memory 820, and a radio frequency (RF) unit 830. The processor 810 implements the proposed functions, procedures, and/or methods. Layers of a radio interface protocol can be implemented by the processor 810. The processor 810 splits a frequency domain into at least one frequency partition, and is configured such that $K_{SB,E-MBS}$ subbands are allocated to a resource for E-MBS data in the at least one frequency partition. The memory 820 is coupled to the processor 810 to store a variety of information for driving the processor 810. The RF unit 830 is coupled to the processor 810 to transmit and/or receive a radio signal and to transmit the E-MBS data by using the resource for the E-MBS data.

A UE 900 includes a processor 910, a memory 920, and an RF unit 930. The RF unit 930 is coupled to the processor 910 to transmit and/or receive a radio signal and to receive the E-MBS data. The processor 910 implements the proposed functions, procedures, and/or methods. Layers of a radio interface protocol can be implemented by the processor 910. The memory 920 is coupled to the processor 910 to store a variety of information for driving the processor 910.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art. In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of allocating resources for enhanced multicast broadcast service (E-MBS) data by a device in a wireless communication system in which a frequency domain includes at least one frequency partition (FP), the method comprising:
    determining, by the device, whether a base frequency partition (FP0) is included in the at least one frequency partition;
    allocating, by the device, $K_{SB,E-MBS}$ subbands to the base frequency partition if the device determines that the at least one frequency partition includes the base frequency partition, $K_{SB,E-MBS}$ being a number;
    allocating, by the device, the $K_{SB,E-MBS}$ subbands equitably among the at least one frequency partition if the device determines that the at least one frequency partition does not include the base frequency partition; and
    transmitting, by the device, E-MBS data through the $K_{SB,E-MBS}$ subbands,
    wherein one subband of the $K_{SB,E-MBS}$ subbands includes N1 subband logical resource units (SLRUs), N1 being a number, and
    wherein the N1 SLRUs have contiguous indices among a plurality of physical resource units (PRUs) included in the at least one frequency partition and are PRUs allocated to contiguous resource units (CRUs).

2. The method of claim 1, wherein the $K_{SB,E-MBS}$ subbands are allocated from an SLRU having a smallest index in the base frequency partition if the at least one frequency partition includes the base frequency partition.

3. The method of claim 2, wherein indices of a plurality of SLRUs constituting the $K_{SB,E-MBS}$ subbands are determined by the equation:

$$SLRU_{E-MBS}[k]=SLRU_{FP0}[k], \text{ for } 0 \le k < N1*K_{SB-MBS},$$

where $SLRU_{FP0}[k]$ is an index of an SLRU included in the base frequency partition.

4. The method of claim 1, wherein the $K_{SB,E-MBS}$ subbands are sequentially allocated from an SLRU having a smallest index in a frequency partition of the at least one frequency partition having a smallest index among the at least one frequency partition.

5. The method of claim 1, wherein N1=4.

6. The method of claim 1, wherein $K_{SB,E-MBS}$ is indicated by a Zone Allocation BitMAP field in an AAI-E-MBS_CFG message.

7. The method of claim 1, wherein the E-MBS data is multiplexed with unicast data for a specific user equipment in a frequency division multiplexing (FDM) manner.

8. A base station in a wireless communication system in which a frequency domain includes at least one frequency partition (FP), the base station comprising:
    a radio frequency (RF) unit configured to transmit or receive a radio signal; and
    a processor operatively coupled to the RF unit,
    wherein the processor is configured to:
        determine whether a base frequency partition (FP0) is included in the at least one frequency partition,
        allocate $K_{SB,E-MBS}$ subbands to the base frequency partition if the at least one frequency partition is determined to include the base frequency partition, $K_{SB,E-MBS}$ being a number, allocate the $K_{SB,E-MBS}$ subbands equally to equitably among the at least one frequency partition if the at least one frequency partition is determined not to include the base frequency partition, and transmit E-MBS data through the $K_{SB,E-MBS}$ subbands, wherein one subband of the $K_{SB,E-MBS}$ subbands includes N1 subband logical resource units (SLRUs), N1 being a number, and wherein the N1 SLRUs have contiguous indices among a plurality of physical resource units (PRUs) included in the at least one frequency partition and are PRUs allocated to contiguous resource units (CRUs).

9. A method of receiving enhanced multicast broadcast service (E-MBS) data in a wireless communication system in which a frequency domain includes at least one frequency partition (FP), the method comprising receiving, by a mobile terminal, E-MBS data through $K_{SB,E-MBS}$ subbands, $K_{SB,E-MBS}$ being a number, wherein the $K_{SB,E-MBS}$ subbands are allocated to a base frequency partition FP0 if the at least one frequency partition has been determined to include the base frequency partition;

wherein the $K_{SB,E-MBS}$ subbands are allocated equitably among the at least one frequency partition if the at least one frequency partition has been determined not to include the base frequency partition, wherein one subband of the $K_{SB,E-MBS}$ subbands includes N1 subband logical resource units (SLRUs), N1 being a number, and wherein the N1 SLRUs have contiguous indices among a plurality of physical resource units (PRUs) included in the at least one frequency partition and are PRUs allocated to contiguous resource units (CRUs).

10. The method of claim 4, wherein a number of PRUs constituting each of the at least one frequency partition is determined by the equation:

$$L_{EMBS,FPm} = \begin{cases} N_1 \cdot \left\lceil \frac{K_{SB,E-MBS}}{FPCT} \right\rceil & m < K_{SB,E-MBS} - FPCT \cdot \left\lfloor \frac{K_{SB,E-MBS}}{FPCT} \right\rfloor + 1, \\ N_1 \cdot \left\lfloor \frac{K_{SB,E-MBS}}{FPCT} \right\rfloor & \text{Otherwise} \end{cases}$$

where FPCT is a number of the at least one frequency partition.

* * * * *